United States Patent

[11] 3,545,779

| [72] | Inventor | Thomas S. Simms<br>7715 Trailwind Drive, Cincinnati, Ohio 45242 |
|---|---|---|
| [21] | Appl. No. | 728,134 |
| [22] | Filed | May 10, 1968 |
| [45] | Patented | Dec. 8, 1970 |

[54] WHEELED SKI
13 Claims, 7 Drawing Figs.

[52] U.S. Cl. ................................................ 280/11.28
[51] Int. Cl. ................................................ A63c 17/04
[50] Field of Search ...................................... 280/11.28,
11.19, 7.13, 11.1, 11.26, 11.27, 11.22, 11.23

[56] References Cited

UNITED STATES PATENTS

| 339,318 | 4/1886 | Peer | 280/11.28X |
| 2,253,012 | 8/1941 | Benner et al | 280/11.1(BT) |
| 2,330,147 | 9/1943 | Rodriguez | 280/11.28X |
| 2,927,797 | 3/1960 | Jones et al. | 280/11.26 |
| 3,153,543 | 10/1964 | Magyar | 280/7.13 |
| 3,365,208 | 1/1968 | Blanchard | 280/11.23 |

FOREIGN PATENTS

| 247,346 | 10/1963 | Australia | 280/11.1(BT)UX |
| 3,708 | 1876 | Great Britain | 280/11.19 |

OTHER REFERENCES
Kruse German application Serial No. 1,077,586 printed March 10, 1960 Kl 77b 17 280--11.22

Primary Examiner—Banjamin Hersh
Assistant Examiner—Milton L. Smith
Attorney—Prangley, Clayton, Mullin, Dithmar & Vogel ABSTRACT: A wheeled ski including an elongated frame carrying a front wheeled truck and a rear wheeled truck; each of the wheeled trucks includes a first axle carrying a pair of spaced-apart wheels thereon and a second axle supporting a roller thereon between the wheels, the first and second axles being mounted for turning movement with respect to the truck when the frame is tilted; and a safety boot binding mounted on the frame.

PATENTED DEC 8 1970
3,545,779
SHEET 1 OF 2
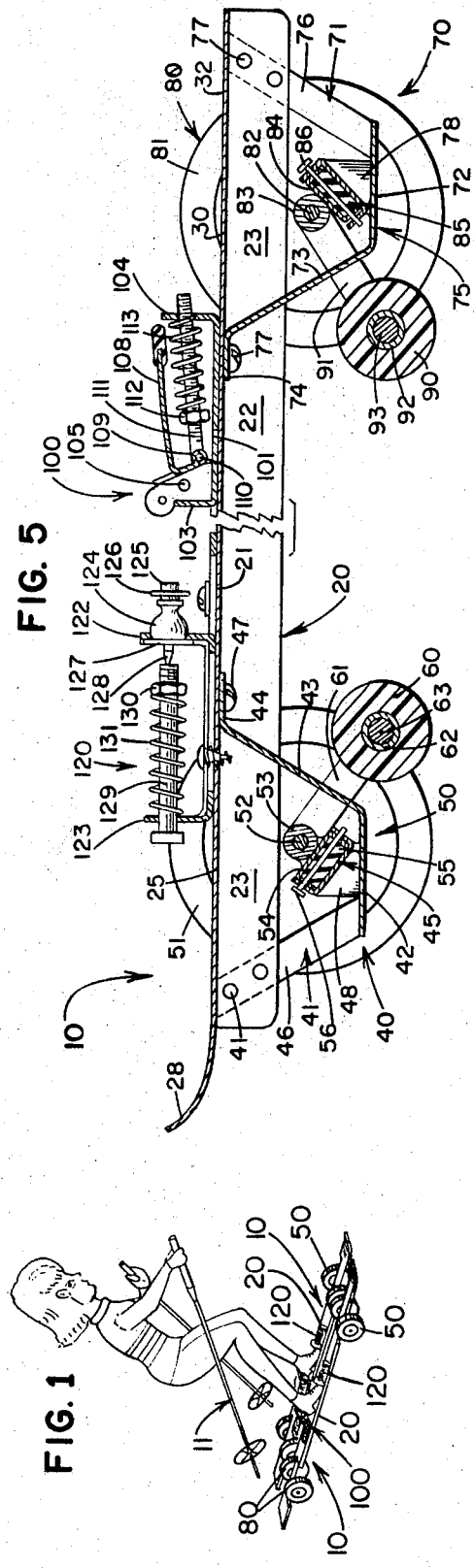
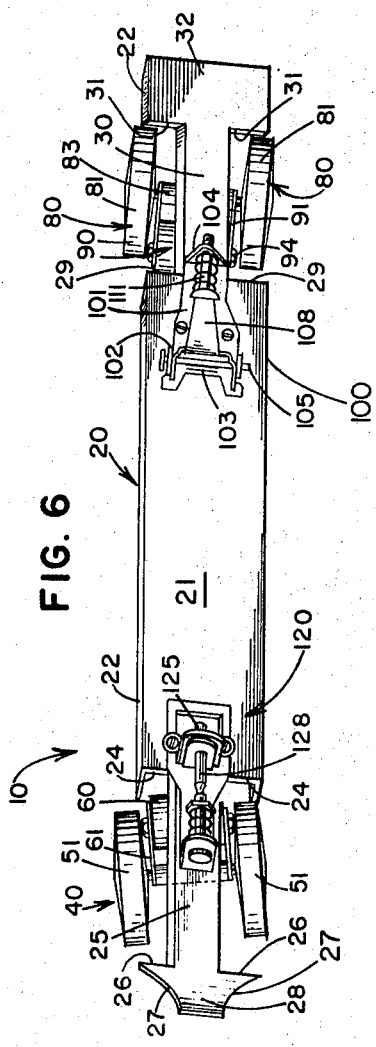
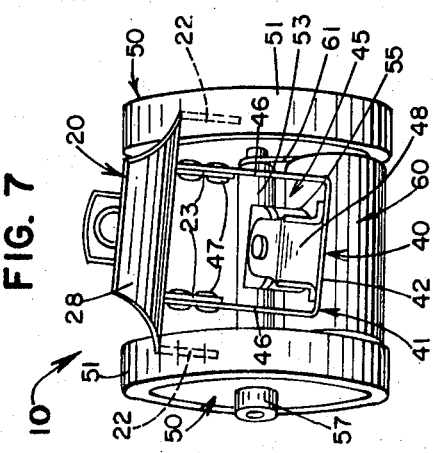
Inventor
THOMAS S. SIMMS
BY
Prangley, Baird, Clayton, Miller & Vogel
ATTYS.

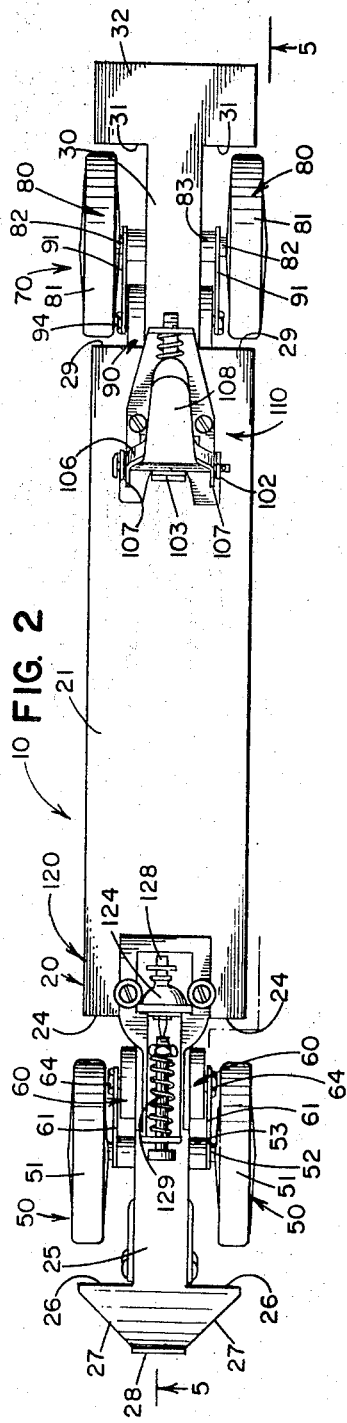
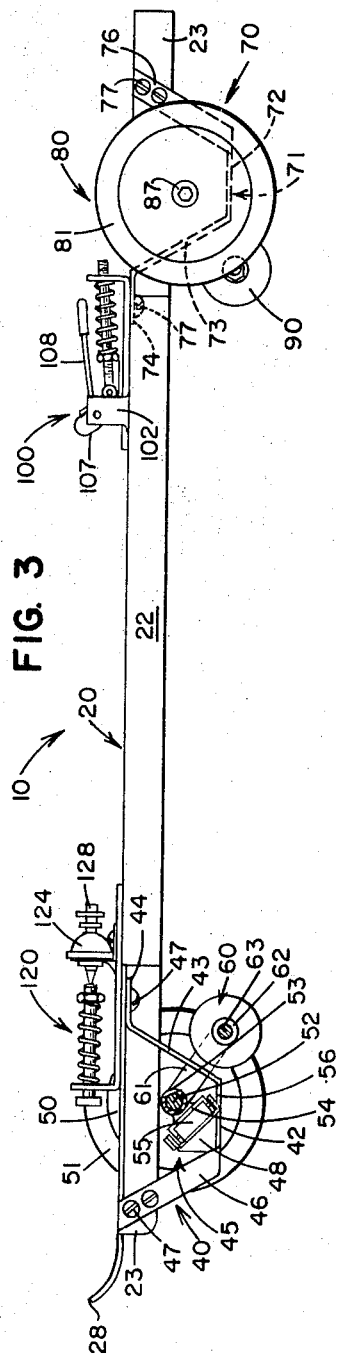
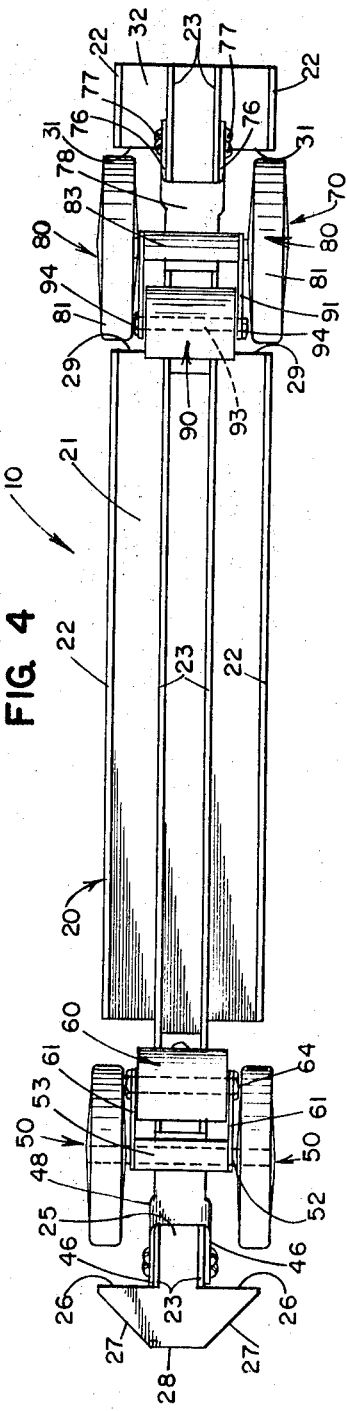
Inventor
THOMAS S. SIMMS

WHEELED SKI

The present invention is directed to a wheeled ski of the type useful to simulate ski motions when traveling down grassy slopes and the like.

It is an important object of the present invention to provide a wheeled ski comprising an elongated frame carrying a front wheeled truck and a rear wheeled truck, each of the wheeled trucks including an axle carrying a pair of wheels thereon and means mounting the axle for turning movement with respect to the longitudinal axis of the frame when the frame is tilted about the longitudinal axis thereof, both of said axles being turned to cause a turning movement of the wheeled ski in the same direction when the user shifts the frame about the longitudinal axis thereof in that same direction, the axles in the normal positions thereof being spaced apart a distance equal to at least about 18 inches, and a safety boot binding mounted on the frame between the trucks for engaging the boot of a user, the wheeled ski permitting the user to simulate ski motions when traveling down grassy slopes and the like.

In connection with the foregoing object, another object of the invention is to provide a wheeled ski of the type set forth, wherein the wheels are disposed in recesses in the sides of the frame and each wheel includes a resilient tire having a diameter of about 5 inches and a tread width of at least about three-fourth inch, the frame having a foot support surface with a width of at least about 4 inches, so as to provide sufficient lever arm, whereby in cooperation with the truck structures to provide a turning radius of no greater than about 15 feet for the wheeled ski.

Another object of the invention is to provide a wheeled ski of the type set forth wherein each wheeled truck includes a first axle carrying at least one wheel thereon and a second wheel carrying a roller thereon, the wheels and rollers cooperating better to simulate ski motions when traveling down grassy slopes and the like.

In connection with the foregoing object, another object of the invention is to provide a wheeled ski of type set forth, wherein each of the rollers have a width of about 2 inches and a diameter of at least about one-half inch, each roller being spaced a short distance away from a plane tangent to the lower surfaces of the wheels.

A further object of the invention is to provide a wheeled ski of the type set forth wherein each wheeled truck includes a first axle carrying a wheel thereon and a second axle carrying a roller thereon and means mounting the axles for turning movement with respect to the longitudinal axis of the frame, all the axles being turned to cause a turning movement of the wheeled ski in the same direction when the user shifts the frame about the longitudinal axis thereof in that same direction.

A still further object of the invention is to provide a wheeled ski of the type set forth wherein the frame is formed of an aluminum extrusion including a substantially horizontal support member and a plurality of longitudinally extending reinforcing ribs on the underside thereof, the extrusion having upturned at the front end thereof.

Further features of the invention pertain to the particular arrangement of the parts of the wheeled ski, whereby the above-outlined and additional operating features thereof are attained.

The invention, both as to its organization and method of operation, together with further objects and advantages thereof, will best be understood by reference to the following specification taken in connection with the accompanying drawings, in which:

FIG. 1 is a diagrammatic view illustrating the use of a pair of wheeled skis made in accordance with and embodying the principles of the present invention;

FIG. 2 is a plan view of a wheeled ski made in accordance with the present invention;

FIG. 3 is a side elevational view of the ski of FIG. 2;

FIG. 4 is a plan view of the underside of the ski of FIGS. 2 and 3;

FIG. 5 is a slightly enlarged view in vertical section with certain parts broken away along the line 5-5 of FIG. 2;

FIG. 6 is a plan view illustrating the turning action of the wheeled trucks on the wheeled ski of FIGS. 2 to 5; and FIG. 7 is a front elevational view of the front or lefthand end of the wheeled ski as illustrated in FIG. 6.

There is illustrated in FIG. 1 of the drawings a pair of wheeled skis 10 in use, each of the wheeled skis 10 being secured to the boots of the user by a safety boot binding 100-—120, the user also being provided with a pair of ski poles 11 which are identical to the standard ski poles except that the pointed steel spikes at the lower ends thereof have been replaced with a rubber member. The wheeled skis 10 and the modified ski poles 11 are particularly constructed and adapted for use on surfaces having no snow or ice thereon, and particularly are intended for use on grassy slopes such as are produced upon the melting of the snow and ice from the usual ski runs. Because of the novel structure of the wheeled skis 10 to be described more fully hereinafter, the user with the assistance of the modified ski poles 11 is able to simulate on the grassy slope the usual ski action achieved when a layer of snow is present on the slope or ski run.

Referring next to FIGS. 2 to 4 of the drawings, only one of the wheeled skis 10 will be described in detail, the wheeled skis 10 of FIG. 1 being identical in construction. As illustrated, the wheeled ski 10 includes an elongated frame 20 which is preferably formed integral of an elongated metal extrusion, the preferred metal being aluminum, a continuous extrusion being cut and modified to provide the shape of the frame 20 illustrated. The metal extrusion prior to shaping and modification thereof includes a generally flat member which in the finished frame 20 constitutes a generally flat support member 21 which is adapted in use to support on the upper surface thereof the booted foot of the user, the original width of the support member 21 being that illustrated in the central portion of the frame 20. On the underside of the support member 21 are four longitudinally extending reinforcing rigs or flanges including a pair of outer reinforcing ribs 22 and a pair of inner reinforcing ribs 23, the reinforcing ribs 22 and 23 all being disposed parallel to each other and normal to the underside of the support member 21 and extending the entire length thereof. The forward end of the frame 20, i.e., the end disposed to the left in FIGS. 2 to 4, has a portion of the original extrusion cut away so as to provide a forwardly facing surface 24, the outer reinforcing ribs 22 and the associated portions of the support member 21 extending inwardly therefrom to the inner reinforcing ribs 23 having been cut away, whereby a forwardly extending front support 25 is provided having extensions or continuations of the inner reinforcing ribs 23 disposed therebeneath to provide support therefor. At the outer end of the front support 25, the inner ribs 23 have been cut away and an outwardly extending rearwardly facing surface 26 is provided, the front end of the frame 20 having inwardly converging edges 27 which terminate in an upwardly turned end 28 (see FIG. 3). The rear end of the frame 20 is provided with a rearwardly directed rear support 30, rearwardly facing surfaces 29 being provided at the junction with the support member 21 and forwardly facing surfaces 31 being provided. At the rear end of the rear support 30, a broadened rear support member 32 is provided, portions of the outer reinforcing ribs 22 being retained thereon as illustrated.

A front truck 40 is provided at the forward end of the frame 20 and includes a substantially U-shaped frame member 41 having a base 42 from which extends upwardly and rearwardly an integral strap 43 carrying on the upper end thereof a flange 44 secured to the underside of the frame 20 by a suitable fastener 47. The other end of the base 42 carries on either side thereof an upwardly and forwardly directed strap 46, each of the straps 46 being suitably secured to the adjacent one of the inner reinforcing ribs 23 such as by fasteners 47. The base 42 further carries a mounting member 48 on which is mounted a turn mechanism 45 supporting a pair of spaced-apart wheels 50. Each of the wheels 50 carries thereon a tire 51 which may be made of a solid elastomeric material, such as rubber, or alternatively, may be inflatable so as to provide for controlled resiliency thereof.

The wheels 50 are mounted on the ends of an axle 52 which is housed in a bearing sleeve 53, the sleeve 53 being connected to an axle carrier 54 that is a part of the turn mechanism 45, retaining nuts 57 holding the wheels 50 on the axle 52. A resilient block or cushion 55 also forms a part of the turn mechanism 45. The mounting member 48 and the axle carrier 54 are suitably interconnected by a rocking axle 56 to complete the turn mechanism 45.

As will be understood in the art, the purpose of the turn mechanism 45 is to permit the axle 52 carrying the wheels 50 to have the longitudinal axis thereof pivoted or turned with respect to the longitudinal axis of the frame 20 when the frame 20 is tilted about the longitudinal axis thereof, the direction of turning of the axle 52 being dependent upon the direction of tilting of the frame 20 about its longitudinal axis. Further description of the construction and operation of the turn mechanism 45 may be found in U.S. Pat. No. 2,959,423 granted Nov. 8, 1960 to Erich Dornseif for Adjusting Means for Resiliently Mounted Roller Skate Trucks, the construction and operation of the turn mechanism 45 herein being that illustrated in the Dornseif patent.

Disposed between the wheels 50 and spaced slightly rearwardly with respect to the axle 52 is an elongated laterally extending roller 60 formed of a suitable resilient material, such as rubber. The roller 60 is carried by the turn mechanism 45, and more particularly a pair of laterally spaced-apart arms 61 are carried by the bearing sleeve 53 and extend rearwardly and downwardly therefrom. Mounted on the lower rear ends of the arms 61 is an axle 63 carrying thereon a bearing sleeve 62 extending through an opening in the roller 60, whereby to mount the roller 60 for rotation about the axle 63, a pair of retaining nuts 64 retaining the roller 60 in the operative position.

A rear truck 70 is provided at the rear end of the frame 20 and includes a substantially U-shaped frame member 71 having a base 72 from which extends upwardly and forwardly an integral strap 73 carrying on the upper end thereof a flange 74 secured to the underside of the frame 20 by a suitable fastener 77. The other end of the base 72 carries on either side thereof an upwardly and rearwardly directed strap 76, each of the straps 76 being suitably secured to the adjacent one of the inner reinforcing ribs 23 such as by fasteners 77. The base 72 further carries a mounting member 78 on which is mounted a turn mechanism 75 supporting a pair of spaced-apart wheels 80. Each of the wheels 80 carries thereon a tire 81 which may be made of a solid elastomeric material, such as rubber, or alternatively, may be inflatable so as to provide for controlled resiliency thereof.

The wheels 80 are mounted on the ends of an axle 82 which is housed in a bearing sleeve 83, the sleeve 83 being connected to an axle carrier 84 that is a part of the turn mechanism 75, retaining nuts 87 holding the wheels 80 on the axle 82. A resilient block or cushion 85 also forms a part of the turn mechanism 75. The mounting member 78 and the axle carrier 84 are suitably interconnected by a rocking axle 86 to complete the turn mechanism 75.

As will be understood in the art, the purpose of the turn mechanism 75 is to permit the axle 82 carrying the wheels 80 to have the longitudinal axis thereof pivoted or turned with respect to the longitudinal axis of the frame 20 when the frame 20 is tilted about the longitudinal axis thereof, the direction of turning of the axle 82 being dependent upon the direction of tilting of the frame 20 about its longitudinal axis. Further description of the construction and operation of the turn mechanism 75 may be found in U.S. Pat. No. 2,959,423 referred to above, the construction and operation of the turn mechanism 75 herein being that illustrated in this patent.

Disposed between the wheels 80 and spaced slightly forwardly with respect to the axle 32 is an elongated laterally extending roller 90 formed of a suitable resilient material, such as rubber. More specifically, the rollers 60 and 90 may be of identical construction, and instead of being solid as illustrated in the drawing, one or both may be inflatable, whereby to control the resiliency and the action thereof. The roller 90 is carried by the turn mechanism 75, and more particularly a pair of laterally spaced-apart arms 91 are carried by the bearing sleeve 83 and extend forwardly and downwardly therefrom. Mounted on the lower rear ends of the arms 91 is an axle 93 carrying thereon a bearing sleeve 92 extending through an opening in the roller 90, whereby to mount the roller 90 for rotation about the axle 93, a pair of retaining nuts 94 retaining the roller 90 in the operative position.

A safety ski boot binding is provided on frame 20, the safety binding comprising more specifically a heel holding device 100 and a toe holding device 120. Referring particularly to FIGS. 2 and 5 of the drawings, the heel holding device 100 includes a base plate 101 having adjacent to the inner end thereof a pair of upstanding bearing ears 102 and an upstanding stop member 103 of reduced width. The outer end of the base plate 101 is provided with a thrust bearing member 104. A pivot pin of shaft 105 extends between the ears 102 to be pivoted thereby and carries thereon a clamp plate 106 provided with clamp tongues 107 and a lever 108 for operation thereof. Knuckle members 109 are provided on the rear of the clamp plate 106 and carry a cross pin 110 which has connected thereto a rearwardly extending thrust rod 111. The rearward end of the thrust rod 111 extends slidably through an opening in the thrust bearing member 104 and carries thereon a stop nut 112. Disposed between the stop nut 112 and the bearing member 104 is a spring 113 under compression. It will be appreciated that the heel holding device 100 cooperates with a particular form of fixtures provided on the heel of the user's foot, the form of the fixture and further details of the heel holding device being illustrated in U.S. Pat. No. 2,573,955 granted Nov. 6, 1951 to Mitchell H. Cubberley, the disclosure thereof being incorporated herein by reference.

The toe holding device 120 also comprises a base plate 121 which is suitably affixed to the frame 20 and includes an inner end plate 122 at one end thereof and an outer end plate 123 at the other end thereof. Extending through an opening in the inner end plate 122 is a latching member 124 of substantially conical form, the base of which fits in an opening in the inner end plate 121. The latching member 124 terminates at its outer end in an axially projecting latching stud 125, the latching stud preferably including a diametrically enlarged annular stop portion 126 disposed intermediate its free end portion and the body of the latching member 125. The latching member 125 is provided at its inner end with a diametrically enlarged annular fulcruming flange 127 which normally lies flatly against the inner face of the end plate 122. Projecting axially rearwardly from the fulcruming flange 127 is a coupler pin or stud 128. Extending slidably through the outer end plate 123 is a thrust rod 129, the forward end of which is pivotally engaged by the stud 125 of the latching member 124. The thrust rod 129 is normally axially aligned with the latching member 124 and the latching stud 125. The thrust rod 129 is provided with screw threads and threaded thereon is an adjustable thrust nut 130. Mounted on and around the thrust rod 129 intermediate the end plate 123 and the thrust nut 130 is a compression spring 131, the tensioned pressure or thrust of which may be adjusted by means of the thrust nut 130. The toe holding device 120 herein is identical to that disclosed in U.S. Letters Pat. No. 2,616,714 granted Nov. 4, 1952 to Mitchell H. Cubberley, for Safety Ski Binding, the disclosure thereof being incorporated herein by reference.

Summarizing the operation of the heel holding device 100 and the toe holding device 120 these devices 100–120 cooperate to provide a safety ski binding which minimizes injury to the user in case of fall while using the wheeled skis 10, all in the usual manner.

Considering now the operation of the wheeled ski 10, it will be appreciated that the four main wheels 50 and 80 provide for a fundamental support of the wheeled ski 10 upon a support surface such as a grassy ski slope having no ice or snow thereon. By mounting the wheels 50–80 on the turn mechanisms 45–75, respectively, the user of the wheeled ski 10 can guide the direction of movement thereof by simply leaning his weight to the left or to the right, as the case may be. Such leaning of the weight of the user will pivot the frame 20 about the longitudinal axis thereof, such as to the left as shown in FIGS. 6 and 7, such motion tending to turn or tilt the axle 52 and the axle 82 in the directions noted in FIG. 6, i.e., in a direction so as to cause turning of the ski 20 to the left or in the direction in which the frame 20 is tilted about the longitudinal axis thereof. It will be appreciated that tilting of the frame 20 about its longitudinal axis to the right will cause the two axles 52 and 82 to turn in the directions opposite to that illustrated in FIGS. 6 and 7, thereby to cause the wheeled ski 10 to turn to the right. By providing turn mechanisms at both the front and rear of the wheeled ski 10, very small turn radii can be achieved, a desirable turning radius being 15 feet, even turning radii as small as 8 feet being highly desirable.

It was found, however, that simply providing the wheels 50 and 80, even if the wheels have large diameters, produce a speed on grassy slopes which almost approached the speeds that such slopes would provide for regular skis if covered by ice and snow. The speed of the wheeled ski speed 10 is reduced and slowed down by the addition to the wheeled trucks 45–75 of the rollers 60 and 90, respectively. It will be noted from FIGS. 3 and 5 that the lower surfaces of the rollers 60 and 90 are slightly elevated with respect to a plane tangent to the lower surfaces of the main wheels 50 and 80, whereby the rollers 60 and 90 are brought into action only after the main load has been assumed by the wheels 50 and 80. It has been found that the rollers 60 and 90 materially reduce the speed of the wheeled ski 10 down a grassy slope, the rollers 60 and 90 reducing the speed to a value as low as 25 percent of the speed without the use of such rollers.

In order better to simulate ski action, it has been found that the various parts of the wheeled ski 10 preferably have certain dimensions or ranges of dimensions. For example, the frame 20 should have a length between the main axles 52 and 82 of at least about 18 inches and up to as much as 40 inches, shorter distances and longer distances between the axles 52 and 82 tending to detract from the simulated ski action of the wheeled ski 10. A preferred distance between the axles 52 and 82 is approximately 24 to 26 inches. The width of the body 20 in the supporting portion 21 is preferably at least 4 inches so as to give a 2 inch lever arm for control in turning, but the width may be as much as 6 inches or greater. By providing a frame 20 of this width in the portion 21, a full turn can be achieved with an exertion of a force on the order of 150 pounds in tilting the frame 20.

The wheels 50 and 80 preferably have a diameter of about 5 inches and the width of the tread on the tires 51 and 81 is preferably in the range from about three-fourth inch to about 1¼ inches. The rollers 60 and 80 preferably have a width of 2½ inches and a diameter on the order of about 1½ inches to about 2½ inches.

When the parts of the wheeled ski 10 have the dimensions noted above, the user is able to very closely simulate the action of normal skis on snow covered ski slopes, although the user is in fact employing the wheeled skis 10 of the present invention on a grassy slope which may be the very same ski slope, without any snow thereon. It further is pointed out that the use of the turn mechanisms 45 and 75 in the wheeled trucks facilitates the use of the wheeled ski 10 in conjunction with the usual T-Bar lift provided in the vicinity of ski slopes, the turning mechanisms permitting the wheeled skis to follow the contour of the ground beneath the T-Bar lift.

From the above it will be seen that there has been provided an improved wheeled ski which fulfills all of the objects and advantages set forth above.

I claim:

1. A wheeled ski for use on grassy slopes and the like, said ski comprising an elongated frame having a front wheeled truck and a rear wheeled truck thereon, the wheels on said trucks being disposed in recesses in the sides of said frame, each of said wheeled trucks including an axle disposed immediately adjacent to the inner side of said frame carrying a pair of wheels thereon and means mounting said axle for turning movement with respect to the longitudinal axis of said frame when said frame is tilted about the longitudinal axis thereof, both of said axles being turned to cause a turning movement of the wheeled ski in the same direction when the user shifts said frame about the longitudinal axis thereof in that same direction, said axles in the normal positions thereof being spaced apart a distance equal to at least about 18 inches, and a safety boot binding mounted on said frame between said trucks for engaging the boot of a user, said wheeled ski permitting the user to simulate ski motion when traveling down grassy slopes and the like.

2. The wheeled ski set forth in claim 1, wherein each of said wheels includes a resilient tire thereon, said tire having a diameter of about 5 inches and a tread width of at least about three-fourth inch.

3. The wheeled ski set forth in claim 1, wherein said frame has a foot support surface with a width of at least about 4 inches to provide a sufficient lever arm to obtain turning of the axles on said truck structures.

4. The wheeled ski set forth in claim 1, wherein said truck structures are constructed and arranged so as to provide a turning radius of no greater than about 15 feet for said wheeled ski.

5. A wheeled ski for use on grassy slopes and the like, said ski comprising an elongated frame having a front wheeled truck and a rear wheeled truck thereon, each of said wheeled trucks including a first axle carrying a pair of spaced-apart wheels thereon, and a second axle supporting a roller thereon disposed between the associated spaced-apart wheels, and a safety boot binding mounted on said frame between said trucks for engaging the boot of a user, said wheels and said rollers cooperating to permit a user to simulate ski motions when traveling down grassy slopes and the like.

6. The wheeled ski set forth in claim 5, wherein each of said rollers has a width of about 2 inches and a diameter of at least about one-half inch.

7. The wheeled ski set forth in claim 5, wherein each of said rollers is spaced a short distance away from a plane tangent to the lower surfaces of said wheels.

8. The wheeled ski set forth in claim 5, wherein each of said rollers is longitudinally disposed toward the other of said trucks.

9. The wheeled ski set forth in claim 5, wherein each of said second axles is fixedly mounted with respect to the associated first axle.

10. The wheeled ski set forth in claim 5, wherein said frame is formed of an aluminum extrusion.

11. The wheeled ski set forth in claim 10, wherein said aluminum extrusion includes a substantially horizontal support member and a plurality of longitudinally extending reinforcing ribs on the underside thereof.

12. The wheeled ski set forth in claim 10, wherein said extrusion has an upturned front end thereon.

13. A wheeled ski for use on grassy slopes and the like, said ski comprising an elongated frame having a front wheeled truck and a rear wheeled truck thereon, each of said wheeled trucks including a first axle carrying a pair of spaced-apart wheels thereon and a second axle carrying a roller thereon disposed between said spaced-apart wheels, means mounting said axles for turning movement with respect to the longitudinal axis of said frame when said frame is tilted about the longitudinal axis thereof, all of said axles being turned to cause a turning movement of the wheeled ski in the same direction when the user shifts said frame about the longitudinal axis thereof in that same direction, and a safety boot binding mounted on said frame between said trucks for engaging the boot of a user, said wheels and said rollers and said mounting means cooperating to permit a user to simulate ski motions when traveling down grassy slopes and the like.